United States Patent [19]

Kudo

[11] Patent Number: 4,865,639
[45] Date of Patent: Sep. 12, 1989

[54] GLASS SHEET BENDING MOLD

[75] Inventor: Masashi Kudo, Yokohama, Japan

[73] Assignee: Asahi Glass Company, Ltd., Tokyo, Japan

[21] Appl. No.: 216,018

[22] Filed: Jul. 7, 1988

[30] Foreign Application Priority Data

Jul. 7, 1987 [JP] Japan .................. 62-169392

[51] Int. Cl.$^4$ ............................ C03B 23/02
[52] U.S. Cl. ...................... 65/287; 65/288; 65/374.12
[58] Field of Search .......... 65/106, 107, 286, 287, 65/288, 290, 291, 374.12

[56] References Cited

U.S. PATENT DOCUMENTS

| 1,449,789 | 3/1923 | Smith | 65/374.12 X |
| 2,746,209 | 5/1956 | Walters | 65/374.12 X |
| 3,536,466 | 10/1970 | Kurokawa et al. | 65/374.12 X |
| 4,204,854 | 5/1980 | McMaster | 65/106 |
| 4,218,243 | 8/1980 | Kiyonaga et al. | 65/287 X |
| 4,222,763 | 9/1980 | McMaster | 65/287 |
| 4,300,935 | 11/1981 | Seymour | 65/287 X |
| 4,661,141 | 4/1987 | Nitschke et al. | 65/273 |

FOREIGN PATENT DOCUMENTS 53-41318  4/1978  Japan ................ 65/374.12

Primary Examiner—Robert L. Lindsay
Attorney, Agent, or Firm—Oblon, Spivak, McClelland, Maier & Neustadt

[57] ABSTRACT

A glass sheet bending mold for bending a heated glass sheet into a predetermined shape is formed by casting a steel material having a heat resistance properties so as to be stable at a temperature suitable for bending a glass sheet. The glass sheet contacting surfaces of the mold is a precisely curved surface finely finished by shaving or grinding.

4 Claims, 2 Drawing Sheets

GLASS SHEET BENDING MOLD

BACKGROUND OF THE INVENTION

1. Field of the Invention

The present invention relates to a mold for bending a glass sheet into a predetermined shape.

2. Discussion of the Background

Glass sheets having a configuration corresponding to that of a curved portion or a corner of an automobile and a building have been widely used in the automobile industry, the construction industry and so on to thereby seek comfort by widening view and increasing lighting efficiency, or to obtain a beautiful appearance. The glass sheet having a curved or bent portion is manufactured, for instance, by heating the glass sheet at a temperature suitable for bending it, pressing the heated glass sheet by a metal mold having a predetermined shape, and then blowing air to the glass sheet to rapidly cool it while keeping a shaped configuration, or leaving the glass sheet suspended in air until the heated glass sheet approaches a predetermined temperature. For this purpose, various methods and apparatuses for conducting the methods have been proposed. However, in any method and apparatus, it is necessary to use a metal mold to shape the glass sheet into a predetermined configuration. The metal mold is usually fabricated by processing a plate or plates made of stainless steel.

For instance, when a curved glass sheet having a complicated shape such as a glass sheet having a three-dimensionally curved surface used for rear windows, front windows, side windows, roof windows for automobiles is to be manufactured, a metal mold should be so designed and shaped as to have a curved surface by which a final glass sheet product having a curved surface corresponding to that of the metal mold is formed. Heretofore, the metal mold is prepared as follows. A stainless steel plate is divided into a predetermined number of cut pieces; each of the cut pieces is bend-shaped to have a predetermined shape; the cut pieces are successively joined by welding so as to form a curved surface having a three-dimensional configuration; reinforcing ribs are attached on the back surface of the joined plates by welding; and a front surface portion to which a heated glass sheet is brought into contact (hereinbelow, referred to as a glass sheet contacting surface) is precisely shaved or ground by a numerically-controlled shaving machine or grinding machine to obtain a predetermined shape contacting surface.

However, in the conventional mold, the various steps of preparation of the cut-pieces, welding of the cut pieces, welding of the reinforcing ribs on the back surface of the mold and so on are required. Accordingly, the wall thickness of a stainless steel plate usable as a material for the mold is limited from the standpoint of ease in bending of each of the cut pieces and welding them. Usually, it is difficult to use the stainless steel plate having a thickness of about 6 mm or more. Actually, a stainless steel plate having a thickness of less than 6 mm is used because the glass sheet contacting surface of the mold has to be processed for fine finishing by an NC shaving or grinding method. In addition, use of the stainless steel plate primarily determines the wall thickness, whereby flexibility in attaching the reinforcing ribs is greatly limited, and flexibility in distribution of the wall thickness is also greatly limited.

In the conventional metal mold, there may be a case where a metal mold having a finely finished glass sheet contacting surface as expected can not be obtained. There may be a case where that a metal mold having a predetermined configuration of glass sheet contacting surface is used for a long time and the glass sheet contacting surface of the mold has to be adjusted again. Or, there may be a case where it is necessary to change a curved portion in the glass sheet contacting surface in the course of a trial manufacturing stage of a curved glass sheet to a final product manufacturing stage. In these cases, it is difficult to obtain a complete mold by only the NC shaving or grinding method, and there may be a case where a fresh mold has to be prepared even by a slight change of the glass sheet which is finally produced.

Further, the metal mold fabricated by bending each of the cut pieces of the stainless steel plate followed by welding them easily suffers from thermal deformation when the mold is used under a high temperature condition.

SUMMARY OF THE INVENTION

It is an object of the present invention to provide a glass sheet bending mold which allows easy modification of the glass sheet contacting surface by only shaving and/or grinding operations even when a predetermined shape of and accuracy in the glass sheet contacting surface of the mold can not be obtained, and when a change of the glass sheet contacting surface of the mold is required due to the change of the shape of a final glass sheet product.

It is another object of the present invention to provide such mold so as to not be susceptible to the influence of heat.

The foregoing and other objects of the present invention have been attained by providing a glass sheet bending mold for bending a heated glass sheet into a predetermined shape, which is made of cast steel having a heat resistance properties such as being stable at a temperature suitable for bending a glass sheet.

In the present invention, such steel may be a stainless material of a Cr series, a high Cr series or a high Cr-Ni series, a heat resistance steel material of a high Cr-C series or a high Cr-Ni-C series, or a heat-resistant steel alloy material such as an Fe series, an Ni series or a Co series and so on. Preferably, stainless steel having durability under exposure of a temperature of at least 700° C. is used from the viewpoints of corrosion resistance and heat resistance properties and manufacturing cost.

A method of fabricating the mold by using the above-mentioned material is not limited. For instance, a casting method such as a shell molding method, a die-casting method, a green mold casting method, a self-setting casting method, a vacuum casting method, and other method may be used.

The shape of a final glass sheet product is, of course, determined by the shape of the mold formed by casting the above-mentioned material, and the degree of accuracy of the final glass sheet product is also determined by the degree of accuracy of the glass sheet contacting surface of the mold. Accordingly, the glass sheet contacting surface should be processed with high precision. For this, the glass sheet contacting surface is preferably processed by shaving and/or grinding operations. In consideration that the mold of the present invention is useful for manufacturing a glass sheet product having a complicated three-dimensional curved surface, the glass sheet contacting surface is formed by shaving or grinding it to have a precisely finished curved surface.

The wall thickness of the mold at a portion corresponding to the glass sheet contacting surface is preferably at least 20 mm in order to allow shaving and/or grinding operations after the fabrication of the mold so as to be able to modify the shape of the final glass sheet product. Further, it is preferable that the wall thickness of the part of the mold which is required to be shaved and/or ground after completion of the mold is made greater than the wall thickness of the portion, so that the mold satisfies requirements of change in the shape of the final glass sheet product. For instance, the wall thickness of a curved portion and/or a corner in the mold is made greater than the wall thickness of a relatively flat portion in the mold, or the wall thickness of the relatively flat portion is made greater than that of the curved portion and/or the corner portion in the mold, depending on requirements for the glass sheet product to be manufactured by using the mold.

The mold of the present invention is applicable to any glass sheet shaping method as far as a glass sheet is heated at a bend-processing temperature. For instance, a method of pressing a glass sheet between a male die and a female die, a method of shaping the glass sheet by bringing it in contact with a mold by vacuum function in or outside a heating furnace may be used. Particularly, the mold of the present invention is useful for a horizontal furnace press system because it has high heat resistance properties, is free from thermal deformation at a high temperature and is flexible in adjusting the wall thickness and selection of positions when reinforcing ribs are to be attached. Further, the mold of the present invention is advantageously used for a method utilizing vacuum-sucking function by forming a number of apertures in the glass sheet contacting surface of the mold.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

Preferred embodiments of the glass sheet bending mold of the present invention will be described with reference to the drawings.

DESCRIPTION OF THE PREFERRED EMBODIMENTS

Figure 1:
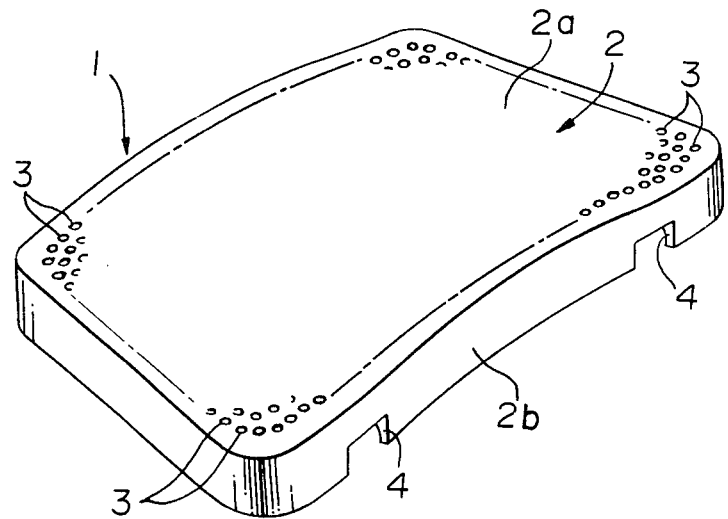
FIG. 1 is a perspective view of an embodiment of the glass sheet bending mold according to the present invention.
Figure 2:
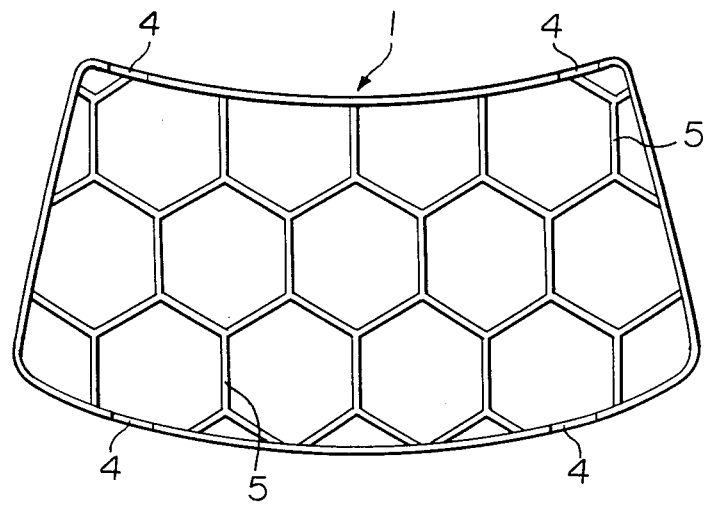
FIG. 2 is a plane view showing an embodiment of the back surface of the mold.
Figure 3:
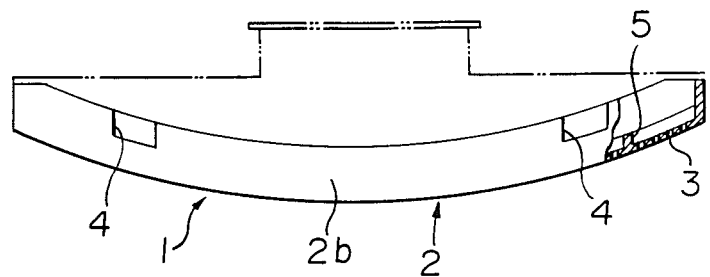
FIG. 3 is a side view partly cross-sectioned of the mold shown in FIG. 2.

FIGS. 1 to 3 show an embodiment of the glass sheet bending mold 1 for forming a rear window glass for an automobile. The mold 1 is formed by casting stainless steel (SCS 11) by a shell-mold casting method, and is durable to a heating temperature (900° C.) or higher, which is required to bend a glass sheet such as float glass, sodalime silicate glass and so on (with a bend-processing temperature: 600° C.–650° C.) in a horizontal furnace pressing system.

In this embodiment, the wall thickness of the mold 1 just after being cast at a portion corresponding to the glass sheet contacting surface 2 is about 26 mm. The glass sheet contacting surface 2 of the mold 1 is processed by an NC processing method to have a predetermined shape, and finally, it has a uniform wall thickness of about 20 mm when it is finished to have a highly accurate shape. Further, in the front face 2a of the glass sheet contacting surface 2, there are a number of apertures 3 having a small diameter in the entire region to which a glass sheet is sucked by the function of vacuum. A plurality of cut portions 4 are formed in the side faces 2b to mount a supporting frame for the mold 1.

A number of honeycombed reinforcing ribs 5 are formed integrally with the backside of the mold 1 in a form of continuous pattern of regular hexagons as shown in FIG. 2. The reinforcing ribs 5 can be formed by other than the continuous pattern of the regular hexagons. However, the reinforcing ribs 5 having the regular hexagons reduce the concentration of stresses at each corner portion to thereby maintain its durability and reduce the thermal deformation of the mold.

Figure 4:
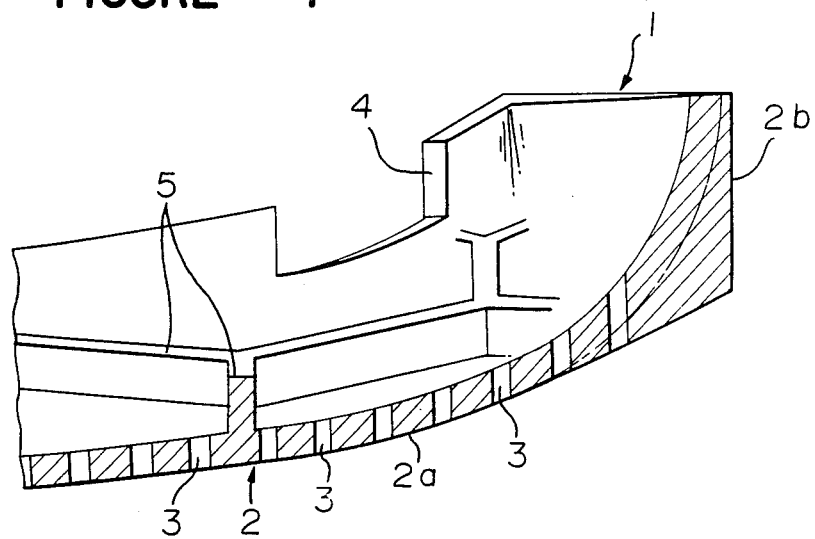
FIG. 4 is an enlarged cross-sectional view of another embodiment of the mold according to the present invention.

FIG. 4 is a cross-sectional view partly broken of another embodiment of the mold 1. The mold 1 is formed such that corner portions on the contacting surface side of the mold have a relatively acute angle (about 90° in this embodiment) and the back face side of the mold 1 is curved, whereby the wall thickness of the corner portion is greater than the wall thickness of a flat portion at the center of the mold.

According to the embodiment shown in FIG. 4, in the case where the mold 1 is first shaped to have the corner portions with a relatively acute angle in a trial stage, and then, the design is changed so that the corner portions having an acute angle is modified to have a curved form as indicated by one-dotted chain line in the stage of manufacturing a final product, the configuration of the mold 1 as shown in FIG. 4 permits a numerically controlled shaving or grinding operation of the corner portions so that it is processed in a curved form extending from the front face 2a of the glass sheet contacting surface 2 to the side face 2b of the mold 1.

In the embodiments described above, explanation was made as to the construction and a method of manufacturing a male die. However, it is, of course, possible to apply the present invention to a female die.

In the embodiment shown in FIG. 4, the wall thickness of the corner portion is made greater than the wall thickness of the other portion. However, the wall thickness of the relatively flat portion extending between both corner portions may be formed so as to be greater than the other portion, if necessary.

Thus, in accordance with the present invention, the mold for bendiing a glass sheet is formed by casting steel having heat resistance such as being stable at a temperature suitable for bending the glass sheet. Accordingly, flexibility in designing the mold is high and it is free from influence to a high temperature. Further, the mold of the present invention satisfies requirements such as shaving or grinding after completion of the mold in the case where a desired shape and accuracy in a curved glass sheet contacting surface of the mold could not be obtained as expected.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A glass sheet bending mold for bending a heated glass sheet into a predetermined shape, which comprises:

a substantially convex shaped mold made of a cast steel having heat resistance properties so as to be stable at a temperature suitable for bending a glass sheet wherein the wall thickness of corner portions of said mold is greater than that of a relatively flat portion of said mold such that said corner portions are processable so as to have a convex curved form and wherein a plurality of apertures are formed in a glass sheet contacting surface of said mold and overlap at least part of said corner portions for application of vacuum suction on said glass sheet.

2. The glass sheet bending mold according to claim 1, wherein said cast steel comprises stainless steel durable to a temperature of at least 700° C.

3. The glass sheet bending mold according to claim 1, wherein the glass sheet contacting surface of the mold comprises a curved finished surface.

4. The glass sheet bending mold according to claim 1, wherein the wall thickness of the glass sheet contacting surface of the mold is at least 20 mm.

* * * * *